Aug. 1, 1939. H. E. McCRERY Re. 21,169

WEIGHING APPARATUS

Original Filed Nov. 6, 1935 4 Sheets-Sheet 1

INVENTOR

Harold E. McCrery by

Stebbins, Blenko & Parmelee

His Attys.

Aug. 1, 1939. H. E. McCRERY Re. 21,169

WEIGHING APPARATUS

Original Filed Nov. 6, 1935 4 Sheets-Sheet 2

INVENTOR

Harold E. McCrery by

Stebbins, Blenko & Parmelee. His Attys.

Aug. 1, 1939. H. E. McCRERY Re. 21,169

WEIGHING APPARATUS

Original Filed Nov. 6, 1935 4 Sheets-Sheet 3

INVENTOR

Harold E. McCrery by

Stebbins, Blenko & Parmelee.

His Attys.

Aug. 1, 1939. H. E. McCRERY Re. 21,169

WEIGHING APPARATUS

Original Filed Nov. 6, 1935 4 Sheets-Sheet 4

INVENTOR

Harold E. McCrery by

Stebbins, Blenko & Parmelee,

His Attys.

Reissued Aug. 1, 1939

Re. 21,169

UNITED STATES PATENT OFFICE 21,169

WEIGHING APPARATUS

Harold E. McCrery, Dayton, Ohio, assignor to Blaw-Knox Company, Blawnox, Pa., a corporation of New Jersey Original No. 2,066,012, dated December 29, 1936, Serial No. 48,544, November 6, 1935. Application for reissue December 12, 1938, Serial No. 245,232

21 Claims. (Cl. 249—14)

This invention relates to improvements in mechanism for apportioning by weight various materials to be mixed together, such devices being commonly termed "batchers". The apparatus described herein is especially adapted for the apportioning of such materials as sand, crushed stone, gravel, slag and cement, for the making of concrete. The invention, however, may be applied to other materials to be apportioned into batches.

In my Patent No. 2,040,703 which issued on application Serial No. 48,543, filed November 6, 1935, there is described and claimed a gate mechanism for controlling the flow of cement or other fine material, the control of which presents difficulties not encountered to the same extent with material of larger size.

Some of the objects of the invention are to increase the accuracy of apportioning the various ingredients of the batch by weight, to increase the speed of operation without sacrifice of accuracy, to relieve the operator of manual control of certain parts of the mechanism where accuracy and speed are most desirable, and to prevent the use of an incorrectly measured quantity of any ingredient.

The apparatus of the present invention includes means for the supply of the different materials to be weighed, mechanism for charging the materials into a hopper, a weighing hopper for receiving the materials, a scale for weighing the materials individually, and means for discharging the materials from the hopper after they have been properly apportioned as desired.

One of the principal features of the present invention is the provision of mechanism by means of which the operation of the mechanism for charging material into the hopper throws into action the appropriate counterpoise scale beam for the material being charged into the hopper, leaving all of the other counterpoise beams undisturbed and inactive. By means of this feature, the operator is not limited as to the order in which the various ingredients may be apportioned, as is the case in other semi-automatic arrangements, but may weigh out the various ingredients in any desired order and nevertheless is prevented from weighing out any material on a counterpoise beam set for a different material.

Another important feature of the invention is the incorporation of means by which it is rendered impossible for the operator to actuate any charging mechanism when any other charging mechanism is operating, each charging device being automatically locked against opening not only when any other charging mechanism is operating, but also whenever the scales are not in perfect balance, indicating that the proper amount of each ingredient that has previously been weighed is in the weighing hopper.

Another important feature is the rendering of it impossible for the operator to throw any of the counterpoise beams out of action after it has been thrown into action at the time the charging mechanism associated with it is opened except coincident with the opening of the door or doors which discharge the entire batch from the weighing hopper; or to throw any beam out of action without throwing them all out of action, and keeping them so until all the batch has been discharged completely and the scales come to balance in a position indicating that the weigh hopper is entirely empty.

Another important feature of the invention is the provision of mechanism whereby the opening of the discharge door will operate to throw out of action all of the counterpoise beams of the scale connected with the weighing hopper.

In the accompanying drawings which illustrate a present preferred embodiment of my invention, Figure 1 is a front elevation of my batcher illustrating the weighing hopper, storage bins and weighing apparatus;

Figures 2, 3:
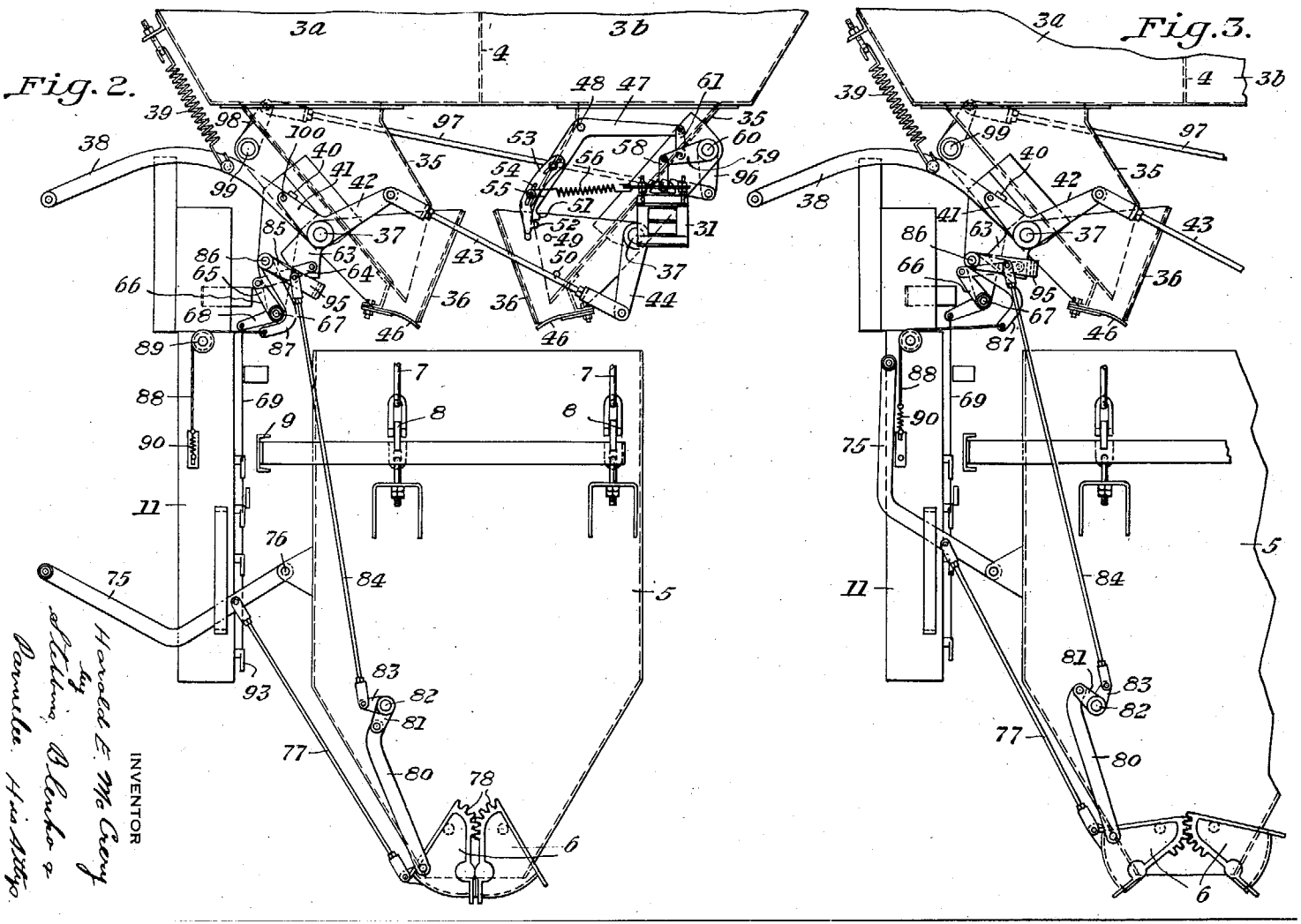
Figure 2 is a side elevation of the apparatus shown in Figure 1 looking at the right-hand side of the apparatus shown in Figure 1 and showing the weighing hopper discharge doors closed.
Figure 3 is a view similar to Figure 2 illustrating a portion of the apparatus and showing the weighing hopper discharge doors opened.
Figure 4:
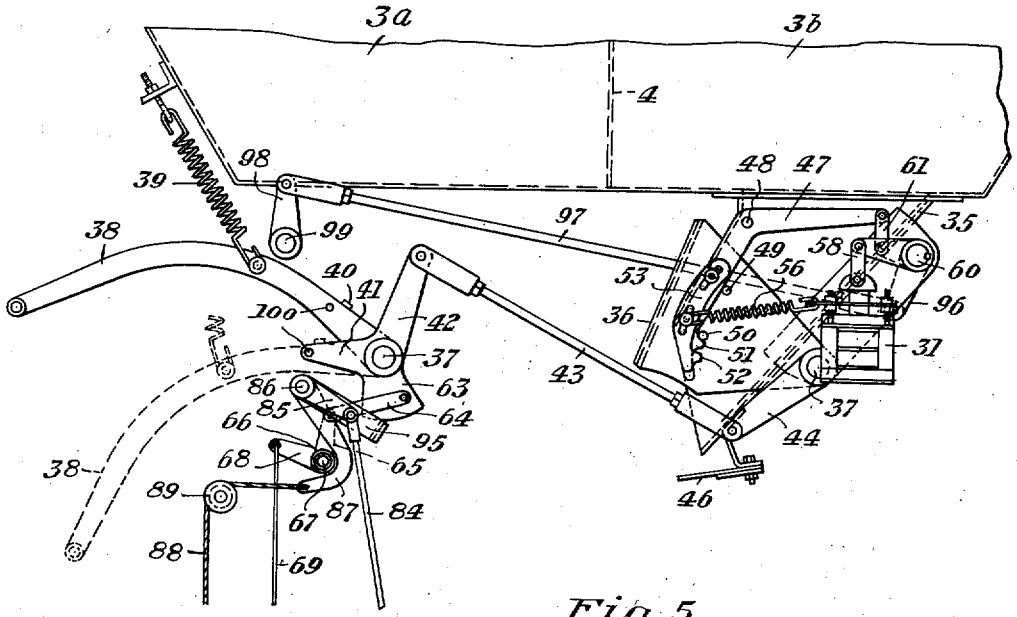
Figure 5:
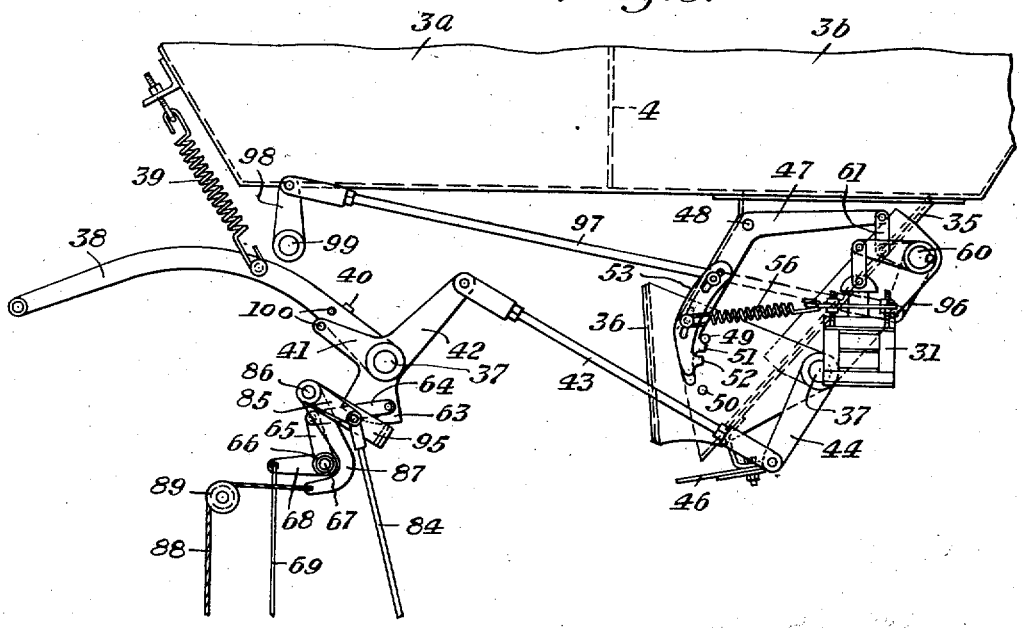
Figure 6:
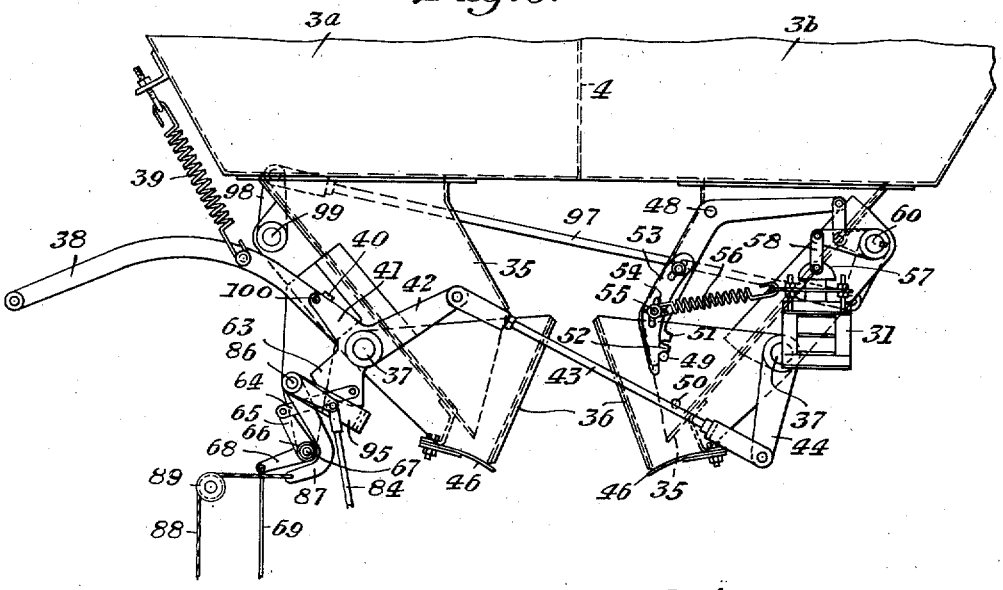

Figures 4, 5 and 6 are views similar to Figure 2 illustrating the gates and operating mechanism which control the flow of material from the storage bins to the weighing hopper. In Figures 4 and 5, for purposes of clearness in illustration, only one gate and its operating mechanism is shown. Figure 4 illustrates the gate in its fully opened position, and Figure 5 in its partly opened position. In Figure 6, two gates are shown in their fully closed position.

Figure 11:
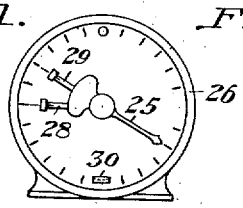
Figure 12:
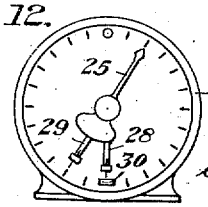
Figure 7:
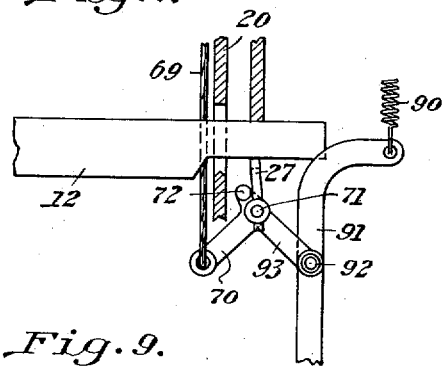
Figure 8:
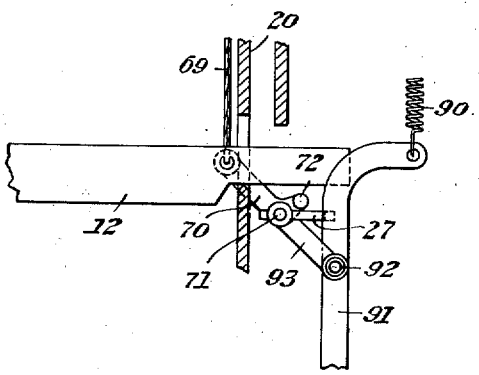
Figure 9:
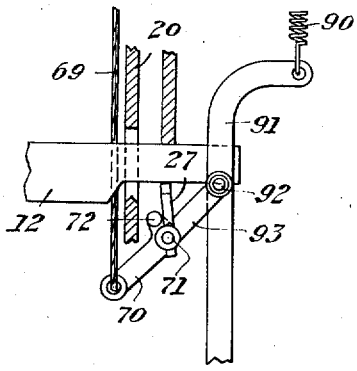
Figure 10:
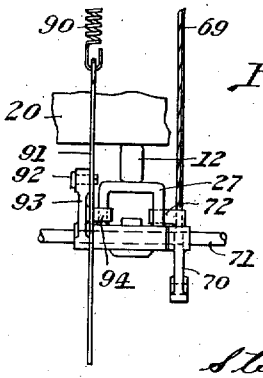

Figures 7, 8 and 9 are front elevations of portions of a counterpoise scale beam and associated mechanism for tripping and resetting the beam keeper;

Figure 10 is similar to Figures 7, 8 and 9, Figure 10 being a view looking from the right of the apparatus shown in Figure 9; and Figures 11 and 12 illustrate the scale dial showing the pointer in different positions and also showing a mercury contact for controlling the operation of a solenoid which controls the latches for the discharge gates.

Referring more particularly to the accompanying drawings, the materials to be weighed into batches are contained in storage bins 1, 2 and 3. The bins 1 and 3 may be divided into two compartments, bin 3 being illustrated in Figures 2 through 6 and being divided by a partition 4 into storage bins 3a and 3b. The different materials are fed from the storage bins successively into a weighing hopper 5. If bin 1 be similarly divided, there will be five compartments discharging material to be weighed on the same scale, namely, the two compartments of bin 1, the bin 2, and the two compartments of bin 3. A predetermined amount of each of the materials is delivered into the weighing hopper successively, and after the total batch has been delivered to the hopper, it is discharged from the hopper 5 through discharge doors 6, the operation of which will be described more fully hereinafter.

The weighing hopper 5 is suspended by hanger rods 7 and linkage 8 in the usual manner so that a portion of the weight in the hopper 5 is transmitted through beams 9 to a master beam 10 in a scale box 11. The scale box contains, in addition to the master beam, a number of counterpoise beams 12, 13, 14, 15 and 16, pivoted at 12a, 13a, 14a, 15a and 16a, respectively, each counterpoise beam being adapted for use in weighing out one of the ingredients of the batch. The number of counterpoise beams will be increased or decreased according to the number of different materials which go to make up the batch. Five counterpoise beams are shown in this instance, to provide for materials of five different kinds or grades, from the five compartments previously referred to. A ladder 20 (Figures 1 and 7 through 10) is secured at its upper end by a link 21 adjacent one end of the master beam 10 in accordance with usual practice, the ladder cooperating with the ends of the counterpoise beams 12, 13, 14, 15 and 16. By the arrangement shown, an upward pull on the master beam 10 equal to a certain definite fraction of the weight of the hopper 5 and the material contained in it is exerted at the point 22 and an established fraction of this weight is transmitted to the ladder 20 in accordance with usual practice.

Also connected to the master beam 10 by a link 23 is a rod 24 which connects the beam with the pointer 25 on a dial 26. This connection and the function performed by it are well known in the art and is such that when any one of the counterpoise beams 12, 13, 14, 15 or 16 is placed in action by throwing its keeper 27 from the position shown in Figure 7 to that shown in Figure 8 so as to throw the counterpoise beam into action, the pointer 25 will move around the dial until its end indicates the weight for which the counterpoise on the counterpoise beam is set, as shown in Figure 11. As material is fed into the hopper, the pointer 25 gradually moves back toward the zero position. In accordance with the present invention, the pointer is provided with two contacts 28 and 29 which make contact with a mercury contact 30 to establish electrical connections with a solenoid 31, shown in Figure 2, which controls latching mechanism for the gates 36 which control the flow of materials from the storage bins to the weighing hopper. The electrical connections are not shown since they may be of any suitable kind to energize and deenergize the solenoid 31. Contact is made between 28 and 30 as the pointer 25 passes a point a relatively small distance from the zero position; and between 29 and 30 contact is established when the pointer 25 is at zero position, and remains established as long as 25 remains in zero position.

The gate mechanism leading from bin 2 to the scales hopper is shown in my Patent No. 2,040,703 and need not be shown in detail here. The gate mechanisms for the two compartments of bin 1 are similar to the corresponding mechanisms for compartments 3a and 3b, illustrated in Figures 2 to 6, and requires no separate description. Each of the bins, for example bins 3a and 3b, is provided with a discharge chute 35 controlled by a drop gate 36 rigidly connected to a shaft 37. In Figures 4 and 5 the gate for compartment 3a has been omitted for purposes of clearness in illustration. Each of the gates is opened by lowering an individual handle 38 which is normally held in the full-line position shown in Figure 4 by a spring 39. Each handle is pivoted on one of the shafts 37 and is provided with a lug 40 which contacts with an arm 41 of a bell crank lever also pivoted to the shaft 37. The other arm 42 of the bell crank is connected by an adjustable rod 43 to an arm 44 rigidly connected to the other shaft 37 to which the gate 36 is also rigidly connected. Clockwise rotation of the shaft 37 shown at the right-hand side of Figure 2 will raise the gate 36 connected to it from its closed position shown in Figure 2 to its open position shown in Figure 4. Such rotation is obtained by lowering the handle 38 from its full-line to its dotted-line position indicated in Figure 4. The gate 36, when in its closed position, has its lower edge resting on a flexible strip 46, such as stiff belting material, so as to close the opening in chute 35.

The gate 36 is locked either in its open position shown in Figure 4, its partly open position shown in Figure 5, or its closed position shown in Figures 2 and 6 by a latch 47 pivoted to the framework at 48. The gate 36 is provided with two pins 49 and 50 which cooperate with lugs 51 and 52 provided on the latch. The lug 52 is carried by a plate 53 which may be adjusted in its position on the latch 47 by means of slots 54 and wing nuts 55. A spring 56 normally urges the latch 47 into engagement with the pins 49 or 50.

When the solenoid is energized, it acts in opposition to the spring 56 to move the latch 47 out of engagement with the pins 49 or 50. The core 57 of the solenoid is connected by a link 58 to an arm 59 rigidly secured to a shaft 60. A link 61 connects the arm 59 with the latch 47. It will be seen therefore that as the solenoid 31 is energized, the core 57 is drawn downwardly, thereby moving the link 61 downwardly and causing the latch 47 to rotate clockwise about its pivot 48 to disengage the lugs 51 and 52 from the pins 49 or 50. The single solenoid 31 controls the latches 47 for all of the gates 36. Rigidly connected to the shaft 60 is an arm 96 which is connected by a rod 97 to an arm 98 rigidly connected to a shaft 99 on the opposite side of the bin 3. Latching mechanism similar to that described is provided for each of the gates 36, the latching mechanism being operatively connected to either the shaft 60 or the shaft 99.

When the handle 38 is lowered from its full-line position to its dotted-line position shown in Figure 4 in order to open the gate 36, it also throws the keeper 27 for the particular counterpoise beam scale used for weighing the material controlled by that particular gate from the position shown in Figure 7 to that shown in Figure 8, thereby bringing the particular counterpoise beam into action so as to weigh out the desired quantity of material flowing through the chute 35 into the weigh hopper 5, but leaving all other counterpoise beams undisturbed and held inactive by their respective keepers. This insures against an operator by mistake weighing out any material on a counterpoise beam which has been set to weigh out a different material. The connections for tripping the keeper 27 upon lowering of the handle 38 are as follows. When the handle 38 is lowered, the bell crank having arms 41 and 42 and which is pivoted to the shaft 37 is rotated counterclockwise to the position shown in Figure 4. The bell crank also has formed on it a downwardly extending projection 63 to which is pivoted a link 64. The other end of the link 64 is connected to one arm 65 of a bell crank 66 pivoted to a shaft 67. The other arm 68 of the bell crank is connected by a rope 69 which is connected at its lower end to the lower end of arm 70 (Figure 7). The other end of arm 70 is pivoted to a pin 71, to which also is pivoted the keeper 27. The upper end of arm 70 is provided with a lug 72 which contacts with one leg of the keeper 27 and throws the keeper from the position shown in Figure 7 to that shown in Figure 8 as the rope 69 is raised.

The operation of the apparatus thus far described is as follows. When it is desired to weigh out a quantity of material contained in the bin 3b for example, the operator lowers the handle 38 from the full-line to the dotted-line position shown in Figure 4. This opens the gate 36 and at the same time raises the rope 69 so as to throw the keeper 27 into the position indicated in Figure 8 and allow the counterpoise beam 12 used for weighing the material from that particular bin to rest on the ladder 20. This causes the pointer 25 of the dial to assume some such position as indicated in Figure 11, depending upon the desired quantity of material which is to be delivered from the bin 3b. Movement of the pointer from the zero position into the position indicated in Figure 11 breaks the electrical contact with the mercury contact 30, thereby deenergizing the solenoid 31, and allows spring 56 to latch the gate 36 in open position, as shown in Figure 4 and latching closed all other gates which have not been opened. As the material from the bin flows through the chute 35 into the weighing hopper 5, the pointer 25 on the scale moves counterclockwise from the position indicated in Figure 11 to that of Figure 12. When the contact 28 contacts with the mercury contact 30, it energizes the solenoid 31 for a short interval, causing the core 57 of the solenoid to be drawn downwardly, thereby releasing the lug 51 of latch 47 from engagement with the pin 50 and allowing the gate 36 to drop to the partly open position shown in Figure 5 with the lug 51 in engagement with the pin 49. The spring 56 forces the latch 47 into the position shown in Figure 5 after the solenoid has been deenergized by the contact 28 passing out of contact with the mercury contact 30. It is seen that during the first part of the weighing operation, the material is fed from the bin 3b at a fast rate until the approximate quantity of material has been delivered into the weighing hopper 5 and that thereafter the gate is partially closed so that the remaining quantity is weighed at a slower rate in order that accuracy may be obtained and only the desired weight delivered from the bin. When the pointer 25 reaches the zero position on the scale indicated in Figure 1, the contact 29 contacts with the mercury contact 30, thereby again energizing the solenoid 31. This releases the lug 51 of the latch 47 from contact with the pin 49 and allows the gate 36 to drop to the fully closed position indicated in Figure 6.

After the desired quantity of the various materials which go to make up the batch have been weighed in the hopper 5, the operator discharges the batch from the hopper by raising a handle 75 from the position shown in Figure 2 to that shown in Figure 3 in order to open the hopper doors 6. The handle 75 is pivoted to the weighing hopper 5 at 76. A rod 77 is pivoted at its upper end to the handle 75 and at its lower end to one of the doors 6, the two doors being geared together as indicated by the reference numeral 78 so that as one door is opened, it opens the other door. The construction of the discharge doors and the operating mechanism for opening and closing them may be of any usual construction.

Figure 1:
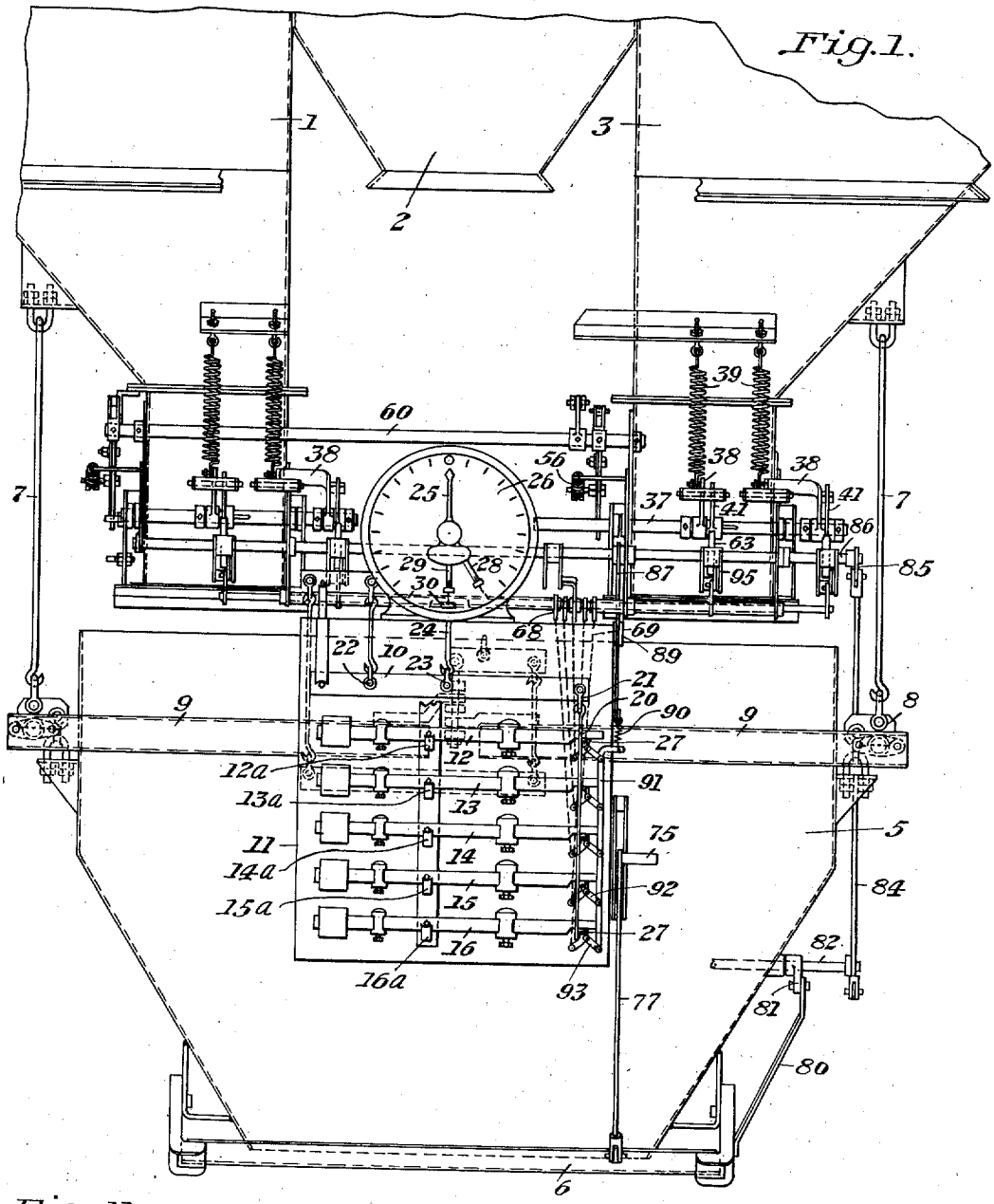

A novel feature of the present invention is the provision of means whereby when the doors 6 are opened, the keepers 27 for all of the counterpoise beams of the scale are reset so as to render the counterpoise beams inactive and ready for the next weighing operation. One means of accomplishing this result is as follows. A link 80 is pivoted at its lower end to one of the doors 6 and at its upper end to an arm 81 of a bell crank pivoted on a shaft 82 supported from the hopper 5. The other arm 83 of the bell crank is connected by a rod 84 to an arm 85 rigidly secured to a shaft 86. An arm 87 is also rigidly secured to the shaft 86, the lower end of the arm 87 being connected to a rope 88 passing over a pulley 89 and connected at its lower end to a spring 90. The spring 90 is connected to a keeper reset bar 91 (Figures 1 and 8). Pivoted to this reset bar at 92 are a number of links 93, there being one link for each keeper 27. The other end of each link 93 is pivoted to the pin 71. A lug 94 extends from the link 93 in such position that as the keeper reset bar 91 is raised from the position shown in Figure 8 to that shown in Figure 9, all of the keepers 27 are brought into the position shown in Figure 9 so as to raise each of the counterpoise beams from the ladder 20 and place the counterpoise beams in position for weighing out a new batch of material.

The bottom doors 6 for the weighing hopper cannot be opened when any of the charging gates 36 are opened, nor can any of the gates 36 be opened unless the doors 6 are closed. Referring to Figures 2 and 3, the shaft 86 which is rotated counter-clockwise upon upward movement of the rod 84 as the doors 6 are opened, is provided with a series of locking yokes 95, one of the yokes cooperating with each of the projecting portions 63 of the bell crank 41—42. When the locking yokes 95 are rotated into the position shown in Figure 3, they lock the projecting portions 63 of the bell crank 41—42 so that the bell crank cannot be operated, thereby preventing opening of the gates 36. Likewise, when any of the gates 36 are open, as in Figures 4 or 5, the projecting portion 63 prevents rotation of yokes 95 required to open the doors 6.

If the electrical mechanism which controls the operation of the solenoid 31 gets out of order, the latching mechanism 47 may be operated manually. In order to make manual operation of the apparatus feasible without delay, a bolt hole 100 is provided in the gate handle 38 and the arm 41 of the bell crank so that they may be bolted together. Manual means for releasing the latches may then be provided and the gates opened and closed manually, but the interconnection between each gate and its corresponding scale beam remains undisturbed and the operator is free to open the respective gates in any order he may desire.

I have illustrated and described a present preferred embodiment of my invention. It is to be understood, however, that the invention may be otherwise embodied within the scope of the following claims.

I claim:

1. Weighing apparatus comprising a plurality of bins each having a discharge opening, a gate for each discharge opening, a weighing hopper, a scale connected to the weighing hopper and having a counterpoise beam for weighing the material delivered from each bin, means for opening each gate individually and in any desired order, and means operable upon the opening of a gate for throwing into action the counterpoise beam which governs the weight of the material controlled by said gate.

2. Weighing apparatus comprising a plurality of bins each having a discharge opening, a gate for each discharge opening, a weighing hopper, a scale connected to the weighing hopper and having a counterpoise beam for weighing the material delivered from each bin, means for opening each gate individually and in any desired order, and means actuated by the means for opening the gate for throwing into action the counterpoise beam which governs the weight of the material controlled by said gate.

3. Weighing apparatus comprising a plurality of bins each having a discharge opening, a gate for each discharge opening, a weighing hopper, a scale connected to the weighing hopper and having a counterpoise beam for weighing the material delivered from each bin and a keeper for each counterpoise beam, means for opening each gate individually and in any desired order, and means operable upon the opening of a gate for releasing the keeper to throw into action the counterpoise beam which governs the weight of the material controlled by said gate.

4. Weighing apparatus comprising a plurality of bins each having a discharge opening, a gate for each discharge opening, a weighing hopper, a scale connected to the weighing hopper and having a counterpoise beam for weighing the material delivered from each bin and a keeper for each counterpoise beam, means for opening each gate individually and in any desired order, and means actuated by the means for opening the gate for releasing the keeper to throw into action the counterpoise beam which governs the weight of the material controlled by said gate.

5. Weighing apparatus comprising a plurality of bins each having a discharge opening, a gate for each discharge opening, a weighing hopper provided with a discharge door, a scale connected to the weighing hopper and having a counterpoise beam for weighing the material delivered from each bin, means for opening the discharge door, and means actuated by the opening of the discharge door and throwing all of the counterpoise beams out of action.

6. Weighing apparatus comprising a plurality of bins each having a discharge opening, a gate for each discharge opening, a weighing hopper provided with a discharge door, a scale connected to the weighing hopper and having a counterpoise beam for weighing the material delivered from each bin and a keeper for each counterpoise beam, means for opening the discharge door, and means actuated by the opening of the discharge door for resetting all of the counterpoise beam keepers to throw all of the counterpoise beams out of action.

7. Weighing apparatus comprising a plurality of bins each having a discharge opening, a gate for each discharge opening, a weighing hopper provided with a discharge door, a scale connected to the weighing hopper and having a counterpoise beam for weighing the material delivered from each bin, means for opening each gate individually and in any desired order, means operable upon the opening of a gate for throwing into action the counterpoise beam which governs the weight of the material controlled by said gate, means for opening the discharge door, and means actuated by the opening of the discharge door for throwing all of the counterpoise beams out of action.

8. Weighing apparatus comprising a plurality of bins each having a discharge opening, a gate for each discharge opening, a weighing hopper provided with a discharge door, a scale connected to the weighing hopper and having a counterpoise beam for weighing the material delivered from each bin and a keeper for each counterpoise beam, means for opening each gate individually and in any desired order, means actuated by the means for opening the gate for releasing the keeper to throw into action the counterpoise beam which governs the weight of the material controlled by said gate, means for opening the discharge door, and means actuated by the opening of the discharge door for resetting all of the counterpoise beam keepers to throw all of the counterpoise beams out of action.

9. Weighing apparatus comprising a plurality of bins each having a discharge opening, a gate for each discharge opening, a weighing hopper provided with a discharge door, a scale connected to the weighing hopper, latches for holding the gates in either open or closed position, means for releasing the latches when the scale is in balance so that a gate may be opened or closed manually, and means operable only when said gates are closed for opening the discharge door.

10. Weighing apparatus comprising a plurality of bins each having a discharge opening, a gate for each discharge opening, a weighing hopper provided with a discharge door, a scale connected to the weighing hopper, latches for holding the gates in either open or closed position, means for releasing a latch on any open gate for a short interval and again latching it in a less open position as the scale is nearing balance, means for again releasing a latch on the gate when the scale is in balance, and means operable only when said gates are closed for opening the discharge door.

11. Weighing apparatus comprising a plurality of bins each having a discharge opening, a gate for each discharge opening, a weighing hopper provided with a discharge door, a scale connected to the weighing hopper and having a scale beam, latches for the gates, a solenoid operably connected to the latches, the solenoid being energized in accordance with movement of the scale beam to release the latches, and means operable only when said gates are closed for opening the discharge door.

12. Weighing apparatus comprising a plurality of bins each having a discharge opening, a gate for each discharge opening, a weighing hopper provided with a discharge door, a scale connected to the weighing hopper and having a counterpoise beam for weighing the material delivered from each bin and a keeper for each counterpoise beam, means for opening the discharge door, means actuated by the opening of the discharge door for resetting all of the counterpoise beam keepers to throw all of the counterpoise beams out of action, and means preventing opening said discharge door and resetting of said counterpoise beam keepers when any of the gates are open.

13. Weighing apparatus comprising a plurality of bins each having a discharge opening, a gate for each discharge opening, a weighing hopper provided with a discharge door, a scale connected to the weighing hopper and having a counterpoise beam for weighing the material delivered from each bin and a keeper for each counterpoise beam, means for opening the discharge door, means actuated by the opening of the discharge door for resetting all of the counterpoise beam keepers to throw all of the counterpoise beams out of action, and means preventing opening said discharge door and resetting of said counterpoise beam keepers when any of the gates are open, said last mentioned means also preventing opening any gate when the discharge door is open.

14. Weighing apparatus comprising a plurality of bins each having a discharge opening, a gate for each discharge opening, a weighing hopper, a scale connected to the weighing hopper and having a counterpoise beam for weighing the material delivered from each bin and a keeper for each counterpoise beam, means for manually opening each gate individually and in any desired and variable order, and mechanical connections between each gate and the keeper for its corresponding counterpoise beam, said connections being operable upon the opening of a gate for releasing the keeper to throw into action the counterpoise beam which governs the weight of the material controlled by said gate.

15. Weighing apparatus comprising a weighing hopper provided with a discharge door, mechanism for charging various materials into the weighing hopper, a scale connected to the weighing hopper and having a plurality of counterpoise beams for weighing the different materials delivered to the hopper, means for opening the discharge door, and means actuated by the opening of the discharge door and throwing all of the counterpoise beams out of action.

16. Weighing apparatus comprising a plurality of bins each having a discharge opening, a weighing hopper provided with a discharge door, a scale connected to the weighing hopper and having a counterpoise beam for weighing the material delivered from each bin, means for opening the discharge door, and means actuated by the opening of the discharge door and throwing all of the counterpoise beams out of action.

17. Weighing apparatus comprising a weighing hopper provided with a discharge door, means for individually supplying a plurality of different materials to said weighing hopper, a scale connected to the weighing hopper and having a plurality of counterpoise beams for weighing the various materials delivered to said hopper and a keeper for each counterpoise beam, means for opening the discharge door, and means actuated by the opening of the discharge door for resetting all of the counterpoise beam keepers to throw out of action all of the counterpoise beams.

18. Weighing apparatus comprising a weighing hopper provided with a discharge door, a plurality of devices cooperating with the hopper for charging material thereto, a scale connected to the weighing hopper and having a plurality of counterpoise beams for weighing the materials charged to said hopper, means for operating each material charging device individually and in any desired order, means operable upon the actuation of a material charging device for throwing into action the counterpoise beam which governs the weight of the material controlled by said device, means for opening the discharge door of the hopper, and means actuated by the opening of the discharge door for throwing out of action all of the counterpoise beams.

19. Weighing apparatus comprising a weighing hopper provided with a discharge door, a plurality of material charging devices cooperating with the hopper for charging material thereto, a scale connected to the weighing hopper and having a counterpoise beam for weighing the material delivered from each material charging device and a keeper for each counterpoise beam, means for operating each material charging device individually and in any desired order, means actuated by each material charging device for releasing the keeper to throw into action the counterpoise beam which governs the weight of the material charged by said device, means for opening the discharge door and means actuated by the opening of the discharge door for resetting all of the counterpoise beam keepers to throw out of action all of the counterpoise beams.

20. Weighing apparatus comprising a weighing hopper provided with a discharge door, a plurality of bins each having a discharge opening, means cooperating with each bin for discharging material therefrom into said weighing hopper, a scale connected to the weighing hopper and having a counterpoise beam for weighing the material delivered from each bin and a keeper for each counterpoise beam, means for opening the discharge door, means actuated by the opening of the discharge door for resetting all of the counterpoise beam keepers to throw out of action all of the counterpoise beams, and means preventing opening of said discharge door and resetting of said counterpoise beam keepers while material is being charged into said hopper.

21. Weighing apparatus comprising a weighing hopper provided with a discharge door, a plurality of material charging devices for charging material into said hopper, a scale connected to the weighing hopper and having a counterpoise beam for weighing the material delivered from each material charging device and a keeper for each counterpoise beam, means for opening the discharge door, means actuated by the opening of the discharge door for resetting all of the counterpoise beam keepers to throw out of action all of the counterpoise beams, and means preventing opening of said discharge door and resetting of said counterpoise beam keepers while material is being discharged into said hopper, said last-mentioned means also preventing operation of said material charging devices when the discharge door is open.

HAROLD E. McCRERY.